Dec. 8, 1931. W. H. TAYLOR 1,835,444
MUD SAVER
Filed Jan. 13, 1931

INVENTOR
William H. Taylor
BY
Westall and Wallace
ATTORNEYS

Patented Dec. 8, 1931

1,835,444

UNITED STATES PATENT OFFICE

WILLIAM H. TAYLOR, OF SEAL BEACH, CALIFORNIA

MUD SAVER

Application filed January 13, 1931. Serial No. 508,454.

This invention relates to a device for preventing loss of "mud" used in drilling oil wells. In the rotary method of drilling oil wells, mud of special characteristics or "slush" is circulated in the well bore by being pumped down through the drill string and out of the tool at the end thereof, returning in the space in the hole outside the drill string. The drill string is made up of stands of pipe, each stand consisting of three or four joints of pipe nominally twenty feet in length and the stands being connected by tool joints. In pulling the drill pipe out of the hole, it is separated or broken only at the tool joints, and the stands placed to one side and in an upright position in the derrick ready for reassembly. In some cases the mud will not flow out of the drill string, so that when this is pulled from the well, it is full of mud. This is known as pulling a wet string. Under such circumstances, when the string is broken the mud will flow out over the derrick floor, making work on the latter difficult and resulting in loss of the mud. It is a primary object of this invention to provide a free falling device for insertion in the drill pipe to prevent the mud flowing out of the stand until the operator or driller is ready to have it do so. Another object is the provision of such a device which may be readily actuated to permit discharge of the mud. Still another object is the provision of such a device which may be readily inserted or removed from the drill string.

Figure 1:
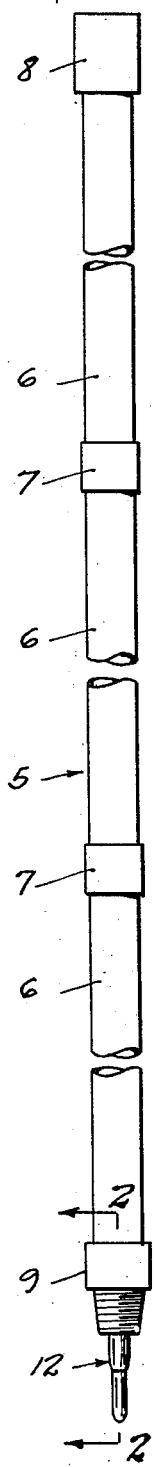
Figure 2:
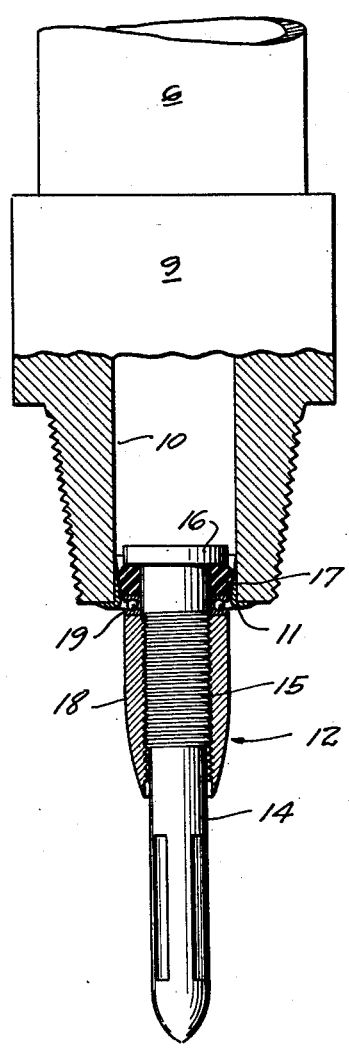
Figure 3:
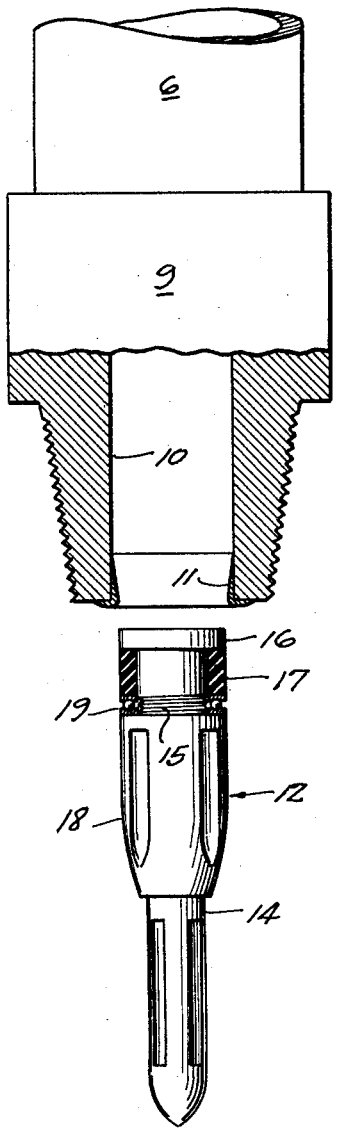

These objects together with other objects and corresponding accomplishments are obtained by means of the embodiment of my invention illustrated in the accompanying drawings in which:

Fig. 1 is an elevation of a stand of pipe having my mud saver seated in the pin of a tool joint at the bottom of the stand; Fig. 2 is a section on an enlarged scale through a portion of the lower tool joint, showing the details of the mud saver; and Fig. 3 is a section similar to Fig. 2, showing the mud saver removed from the tool joint.

Referring with more particularity to the drawings a stand of drill pipe is indicated by 5 and comprises a plurality of joints of pipe 6 joined by pipe couplings 7, with the box end 8 of a tool joint at the upper end and the pin end 9 of a tool joint at the lower end. The stand may include tool joints in place of couplings 7. The tool joint has a bore 10 to permit passage of mud through it. Within the bore at the pin end 9 of the tool joint at the bottom of the stand, a thimble-like seat 11 is secured by welding or other suitable means. A plug indicated generally by 12 is adapted to close the opening through seat 11 and prevent discharge of mud therethrough. Plug 12 comprises a stem 14 with a threaded upper portion 15 and a head 16 against which an expansible packing ring 17, which may be of rubber, is compressed by a sleeve 18. The arrangement is such that when the packing ring is compressed, it will expand and seat in thimble 11, (Fig. 2) and when released it will contract permitting the plug to pass through thimble 11 (Fig. 3).

The mud saver is used as follows. The rubber ring 17 is compressed and expanded and the plug 12 is dropped into the top of the drill string, seating at the tool joint at the bottom of the top stand. The string can now be broken at this point without loss of mud, as the plug will prevent its discharge through thimble 11. When it is desired to discharge the mud, plug 12 is unseated allowing the mud to flow past it. This may be conveniently accomplished by suspending the stand of pipe over a trough or ditch and lowering it until the bottom of the latter pushes the plug upward off its seat. After the stand is emptied, sleeve 18 is unscrewed sufficiently to allow packing ring 17 to contract so as to pass through thimble 11. It may then be tightened again to expand the packing ring and the mud saver will then be ready for use again. To facilitate the compressing and releasing of ring 17, stem 14 and sleeve 18 may be fluted or otherwise shaped to receive a firm grip easily and an anti-friction bearing 19 may be interposed between the sleeve and the ring.

What I claim is:—

1. The combination with a tool joint member having in its bore a reduced section to provide a closure seat, and a free falling unit comprising an elongated body, an expansible packing ring seated thereon, and an adjustable follower on said body or expanding and enabling contraction of said ring whereby said ring may be expanded to engage said closure seat and said body to project through said member for operation of said follower to enable contraction of said ring and passage through said member.

2. The combination with a tool joint member having in its bore a reduced section to provide a seat, and a free falling unit comprising a body having a packing ring seat, a resilient packing ring seated thereon, and an adjustable follower on said body for expanding and enabling contraction of said ring whereby said ring may be expanded to engage said closure seat and said body to project through said tool joint member for operation of said follower to enable contraction of said ring and passage through said member.

3. The combination with a string of drill pipe including a tool joint member having in its bore a reduced section to provide a closure seat, and a free falling unit comprising an elongated body having a packing ring seat adjacent its upper end, a resilient packing ring seated thereon, and an adjustable follower on said body for expanding and enabling contraction of said ring, said unit in expanded position clearing the bore of said drill pipe except for said closure seat whereby said ring may be expanded to engage said closure seat and said body and follower to project through said member for operation of said follower to enable contraction of said ring and passage through said member.

4. The combination with a tool joint member having in its bore a reduced section to provide a closure seat, and a free falling unit comprising an elongated body having a packing ring seat adjacent its upper end, a resilient packing ring seated thereon, and an adjustable sleeve follower threaded on said body for expanding and enabling constraction of said ring whereby said ring may be expanded to engage said closure seat and said body and follower to project through said member for operation of said follower to enable contraction of said ring and passage through said member.

5. The combination with a string of drill pipe including a tool joint member having in its bore a reduced section to provide a closure seat, and a free falling unit comprising an elongated body having a packing ring seat at its upper end, a resilient packing ring seated thereon, and an adjustable sleeve follower threaded on said body for expanding and enabling contraction of said ring, said unit in expanded position clearing the bore of said drill pipe except for said closure seat whereby said ring may be expanded to engage said closure seat and said body to project through said member for operation of said follower to enable contraction of said ring and passage through said member.

In witness that I claim the foregoing I have hereunto subscribed my name this 30th day of December, 1930.

WILLIAM H. TAYLOR.